United States Patent [19]

Williams

[11] Patent Number: 5,176,235
[45] Date of Patent: Jan. 5, 1993

[54] VISCOUS COUPLING APPARATUS

[75] Inventor: Randolph C. Williams, Weedsport, N.Y.

[73] Assignee: New Venture Gear, Inc., Troy, Mich.

[21] Appl. No.: 688,644

[22] Filed: Apr. 19, 1991

[51] Int. Cl.⁵ .............................................. F16D 31/00
[52] U.S. Cl. .................................. 192/58 B; 192/70.2; 192/113 B
[58] Field of Search ................... 192/58 B, 70.2, 113 B

[56] References Cited

U.S. PATENT DOCUMENTS

| | | | |
|---|---|---|---|
| 4,031,780 | 6/1977 | Dolan et al. | 475/85 |
| 4,040,271 | 8/1977 | Rolt et al. | 192/58 B |
| 4,782,930 | 11/1988 | Kuroiwa et al. | 192/58 B |
| 4,899,859 | 2/1990 | Teraoka | 192/4 A |
| 4,900,042 | 2/1990 | Genda | 277/70 |
| 4,928,803 | 5/1990 | Ishikawa et al. | 192/58 B |
| 4,942,951 | 7/1990 | Kriebernegg et al. | 192/58 B X |

Primary Examiner—Leslie A. Braun
Assistant Examiner—Nicholas Whitelaw
Attorney, Agent, or Firm—Harness, Dickey & Pierce

[57] ABSTRACT

A viscous coupling apparatus having first rotary member, a second rotary member coaxially disposed relative to the first rotary member such that the first and second rotary members are rotatable with respect to each other, and housings associated with each of the first and second rotary members for defining a hermetically seal fluid chamber. A first set of viscous clutch plates are disposed within the fluid chamber and are coupled for rotation with the first rotary member. A second set of viscous coupling plates are disposed in the fluid chamber and are coupled for rotation with the second rotary member. The first and second sets of viscous clutch plates being alternately interleaved so as to be rotatable relative to each other. The viscous coupling further comprising a plurality of annular spacer rings each of which is interposed between adjacent ones of the second set of viscous plates for longitudinally positioning the interleaved spacing between the first and second sets of clutch plates. According to the present invention, stop projections are formed on the housing which extend into the fluid chamber for inhibiting excessive axial sliding movement of the outermost second set clutch plates located adjacent thereto while maintaining a predetermined clutch plate pack spacing.

6 Claims, 2 Drawing Sheets

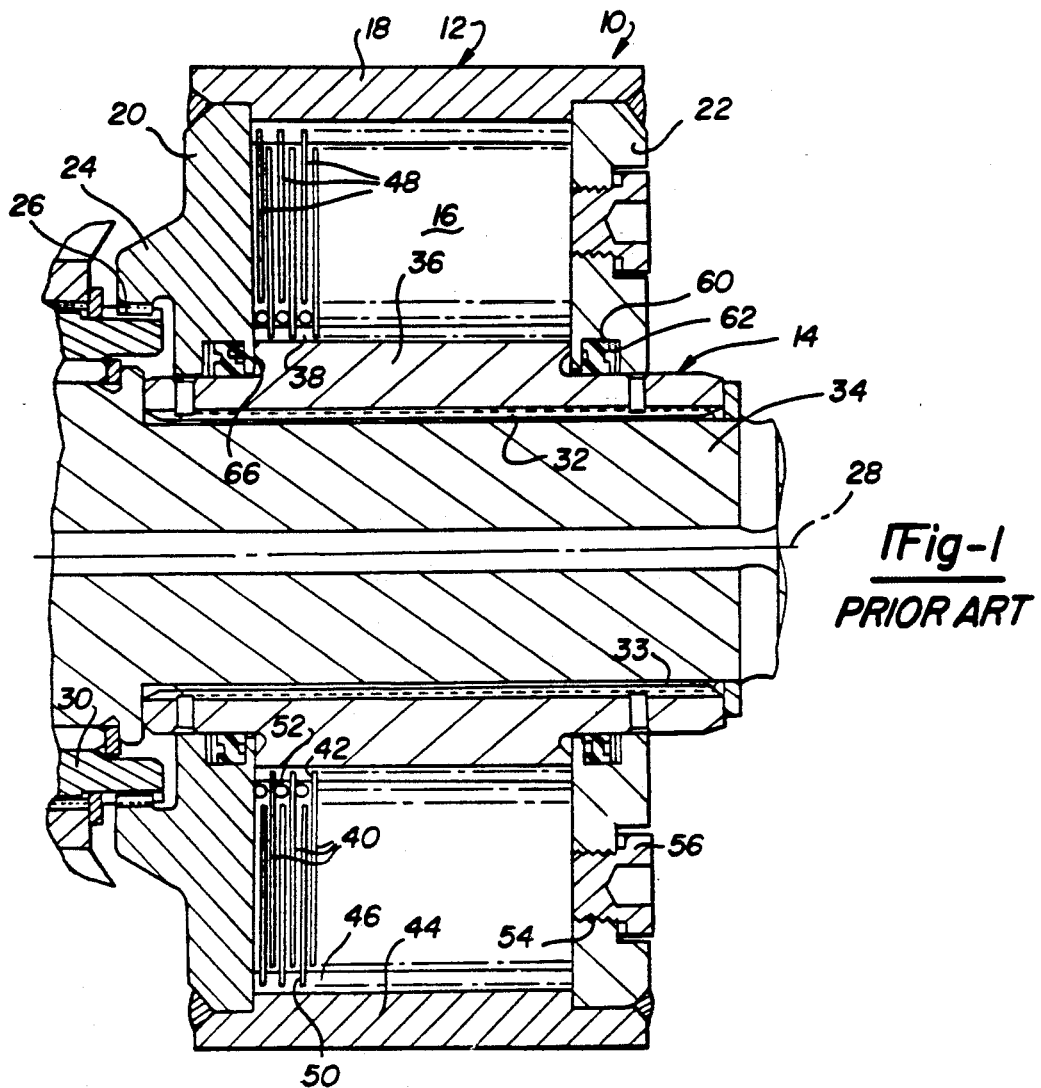

VISCOUS COUPLING APPARATUS

BACKGROUND OF THE INVENTION

The present invention relates to an improvement in a power transmission unit and, more particularly, to a viscous coupling apparatus for use in motor vehicle drivetrain applications.

Conventionally, viscous couplings have been incorporated into motor vehicle drivetrain arrangements for transmitting power in response to the viscous shear characteristics of the fluid confined therein. In general, viscous couplings have a first plurality of clutch plates fixedly splined to a first rotatable member and interleaved with a second plurality of clutch plates fixedly splined to a second rotatable member. The first and second rotatable members define a sealed chamber within which the interleaved clutch plates are confined. The sealed chamber is charged with a viscous fluid for filling the spaces between the interleaved clutch plates. In operation, the viscous coupling transmits only a small amount of torque when the rotational difference between the first and second rotatable members is small, while transmitting a relatively large torque when the rotational difference is portionally larger due to the viscous shear resistance of the viscous fluid between the interleaved clutch plates.

Modernly, viscous couplings are used in numerous power transmission applications such as four-wheel drive transfer cases, differentials and limited-slip intra-axle and inter-axle devices. Examples of transfer cases which incorporate a viscous coupling therein are disclosed in U.S. Pat. No. 4,031,780 to Dolan and U.S. Ser. No. 437,066 filed Nov. 16, 1989 to Frost. For purposes of illustration, FIG. 1 is an enlarged view of viscous coupling apparatus 10 which is substantially identical to that shown in FIG. 2 of the above-mentioned U.S. patent application to Frost. Viscous coupling 10 includes an outer drum assembly 12 and an inner drum housing 14 which define a fluid chamber 16 therebetween. In general, outer drum assembly 12 defines a first rotatable member which is coaxially arranged with respect to inner drum housing 14 which defines a second rotatable member. More particularly, outer drum assembly 12 includes a cylindrical outer drum housing 18 and annular front and rear end cover plates 20 and 22, respectively, which are adapted to close the opposite ends of cylindrical outer drum housing 18. Front cover plate 20 includes a forwardly projecting annular neck section 24 formed within an internally splined opening 26 concentrically disposed about a central axis 28. Internally splined opening 26 is fixedly secured to external splines formed on a gear member, partially shown at 30, for transmitting drive torque to a first output shaft (not shown) of the transfer case for driving a front propeller or drive shaft in a known manner. Likewise, inner drum housing 14 has internal splines 32 adapted for meshed engagement with external splines 33 of a central shaft 34 extending concentrically therethrough for rotation about central axis 28. Central shaft 34 defines a second output shaft of the transfer case for transmitting drive torque to a rear propeller or drive shaft.

A central radially outwardly stepped portion 36 of inner drum 14 is formed to include external longitudinal splines 38 upon which a first plurality of "inner" resistance clutch plates 40 are fixedly secured. Inner clutch plates 40 are flat annular ring-shaped members having splines 42 formed on their inner peripheral bore which are retained on, and non-rotatably engage, inner drum housing external splines 38. A radially inwardly stepped portion 44 of outer drum housing 18, generally concentrically aligned with stepped portion 36 of inner drum housing 14, has internal longitudinal splines 46 formed thereon upon which a second plurality of "outer" resistance clutch plates 48 are mounted. Similarly, outer clutch plates 48 are flat angular rings having splines 50 formed at their outer periphery which are retained on, and non-rotatably engage, outer drum internal splines 46. Furthermore, inner and outer clutch plates 40 and 48, respectively, are alternately interleaved within fluid chamber 16 with an outer clutch plate 48 positioned adjacent each end cover plate 20 and 22.

As in most conventional viscous couplings, inner clutch plates 40 are axially separated by a plurality of annular ring spacers 52 that concentrically surround inner drum longitudinal splines 46. Ring spacers 52 have a predetermined width (i.e. diameter) which is selected to provide a desired "pack" spacing between adjacent inner clutch plates 40 and, in turn, between interleaved clutch plates 40 and 48. Generally, ring spacers are not also used with outer clutch plates 48 and thus allow axial sliding movement of outer clutch plates 48 between adjacent inner clutch plates 40 along splines 46. In addition, fluid chamber 16 is filled with a predetermined quantity of a highly viscous fluid, such as a silicone oil, admitted by way of a filling hole 54 and closed by a seal plug 56. To hermetically seal the viscous fluid within fluid chamber 16 upon relative rotation of inner drum housing 14 and outer drum assembly 12, an elastomeric annular seal 60 and back-up ring 62 are disposed in longitudinally spaced annular recesses 66 that are formed on the inner periphery of front and rear cover plates 20 and 22, respectively.

As is known, viscous coupling 10 is operable to proportionally modify the torque division between central shaft 34 and gear member 30 and, in turn, between the first and second transfer case output shafts in response to the relative rotational speed differential existing between inner drum housing 14 and outer drum assembly 12. Generally, during most driving conditions, inner drum housing 14 and outer drum assembly 12 will be rotating at a substantially similar speed (i.e. the vehicle is travelling on dry pavement). Where the driving conditions involve a slight differential in rotational speed, the viscous fluid will permit viscous shearing to accommodate the rotational differences by a allowing slip. However, as the rotational speed differential and viscous shearing rate increase, the apparent viscosity of the fluid will decrease resulting in a stiffening of the fluid and a transmittal of torque from the clutch plate exhibiting a higher rotational speed. Thus, as the viscous shearing rate increases, viscous coupling 10 becomes increasingly rigid for thereby transmitting an increased amount of torque.

As is known, the "pack" spacing between interleaved inner plates 40 and outer clutch plates 48 is a critical design parameter for developing the desired viscous shear characteristic (i.e. torque vs speed differential) for a given motor vehicle drivetrain application. While conventional viscous couplings, such as those described herebefore, generally perform satisfactorily variations in dimensional stack-up tolerances and assembly tolerances may cause undesirable variations in the viscous shear characteristics and, in turn, the viscous coupling's torque transmission performance. More particularly, it has been discovered that the outermost (i.e. left and right) ring spacers 52 may "fall off" splines 46 on outwardly stepped inner drum portion 36 due to the aforementioned tolerance variations which detrimentally effects the desired clutch plate "pack" spacing. Upon such an occurrence, viscous coupling 10 is not capable of generating the desired torque modification performance characteristics such that the apparatus is largely inoperative for its intended purpose.

SUMMARY OF THE INVENTION

Accordingly, the present invention is adapted to overcome disadvantages associated with conventional viscous couplings and provide an improved viscous coupling apparatus which inhibits premature failure due to tolerance variations. To achieve the above-mentioned object, the improved viscous coupling apparatus of the present invention incorporates longitudinally extending projections, formed on each of the front and rear cover plates, which are sized to inhibit the interleaved clutch plates from "falling off" the inner drum splined stepped portion. Therefore, it is possible to insure increased reliability regardless of conventional tolerance stack-up variations and/or assembly tolerance variations.

It is another object of the present invention to provide an inexpensive design modification which can be readily incorporated in virtually any existing viscous coupling used in motor vehicle drivetrain applications.

Other objects, features and advantages of the improved viscous coupling apparatus will be more clearly appreciated from study of the following description of a preferred embodiment taken in conjunction with the accompanying drawings and appended claims.

BRIEF DESCRIPTION OF THE DRAWINGS

FIG. 1 is an enlarged cross-sectional view of a conventional viscous coupling of the type used in a motor vehicle four-wheel drive transfer case;

FIG. 2 is a cross-sectional view of an improved viscous coupling according to a preferred embodiment of the present invention.

DETAILED DESCRIPTION OF THE PREFERRED EMBODIMENTS

Figure 3:
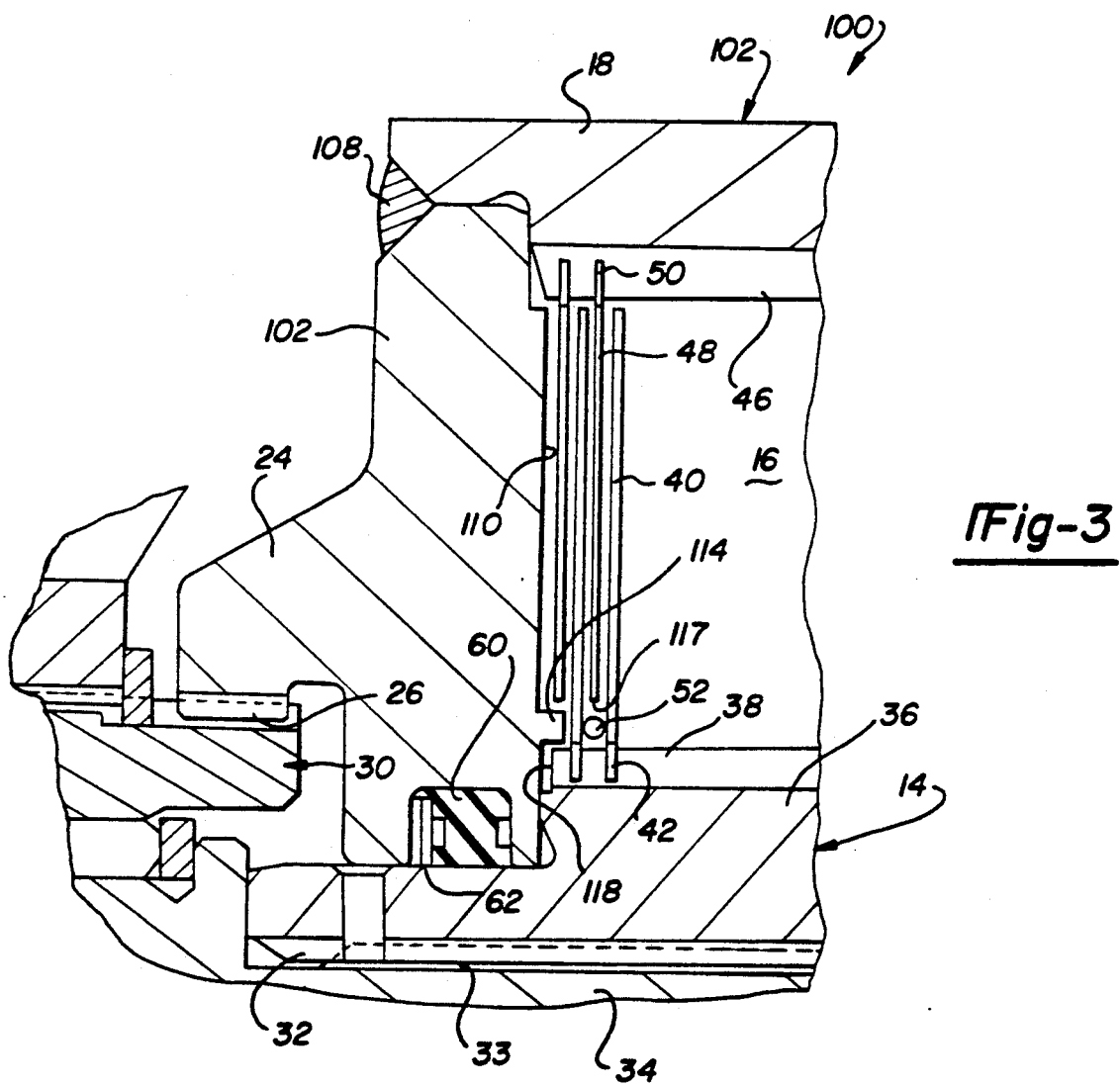
FIG. 3 is an enlarged view of a portion of FIG. 2.

The preferred embodiment of the present invention will now be described with reference to FIGS. 2 and 3. More particularly, FIGS. 2 and 3 illustrate a viscous coupling apparatus 100 to which the improvements encompassed in the present invention are applied, by way of example. Viscous coupling 100 is shown to be of the type operably installed within a motor vehicle four-wheel drive transfer case for distributing engine power (i.e. torque) between front and rear outputs in a known manner. However, it is to be appreciated that the improvements of the present invention, to be described hereinafter in greater detail, are readily adapted for incorporation into virtually all viscous couplings used in motor vehicle drivetrain applications. For the sake of brevity, like numbers are used hereinafter to describe like components previously disclosed.

With reference to FIGS. 2 and 3, rotatable outer drum assembly 102 is shown to include cylindrical outer drum housing 18 and front and rear annular end cover plates 104 and 106, respectively, which are fixably secured such as by welds 108 thereto. Front and rear end cover plates 104 and 106, respectively, each have a radially extending inner face surface 110 and 112, respectively, which define transverse side wall portions of fluid chamber 16.

According to the teachings of the present invention, at least one axially extending stop projection 114 is formed on inner side wall surface 110 of front cover plate 104. Stop projection 114 is located radially outwardly of, and extends longitudinally over, external splines 38 formed on stepped portion 36 of inner drum housing 14. Stop projection 114 is configured to extend substantially perpendicular to inner side wall 110. Preferably, stop projection 114 is a unitary annular projection concentrically surrounding a portion of external splines 38 that is generally longitudinally aligned with spacer rings 52 so as to extend inwardly into fluid chamber 16. Likewise, at least one second axial stop projection 116 is formed on inner side wall 112 of rear cover plate 106. Preferably, second axial stop projection 116 is substantial identical to first stop projection 114 so as to be located radially outward of, and concentric with, external splines 38 formed on stepped portion 36 of inner drum housing 14. More preferably, stop projections 114 and 116 are thin-walled integral hubs formed on their respective end cover plates which are radially spaced inwardly from internal splines 46 on outer drum housing 18 so as to permit the inner peripheral edge surface 117 of the outermost outer clutch plates 48 to be installed thereover.

As best seen in FIG. 3, the axial length of stop projections 114 and 116 is selected such that they each extend slightly over opposite terminal ends 118 and 120 of external splines 46. In this manner, the outermost (i.e. left and right) inner clutch plates 42 which are located adjacent to stop projections 114 and 116 are inhibited from "falling off" their respective terminal ends 118 and 120 of splines 46. As such, annular stop projections 114 and 116 inhibit premature failure of viscous coupling 100 due to conventionally acceptable tolerance stack-up and/or assembly related tolerance variations. Moreover, an inherent feature of the present invention is its ability to maintain the desired clutch plate "pack" spacing for generating the desired viscous shear resistance characteristic while substantially increasing system reliability. Furthermore, while the preferred embodiment illustrates stop projections 114 and 116 used in conjunction with ring spacers 52 surrounding splines 46 formed on inner drum housing 14, it will be appreciated that the concepts of the present invention are also adapted for use with viscous couplings having ring spacers provided for spacing outer clutch plates 48 in a similar fashion.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. In a viscous coupling apparatus for power drive systems comprising:
   a first rotary member;
   a second rotary member coaxially disposed relative to said first rotary member such that said first and second rotary members are rotatable with respect to each other;

a hermetically sealed fluid chamber disposed between said first and second rotary members defined by an outer drum assembly fixably secured to one of said first and second rotary members and an inner drum housing fixably secured to the other of said first and second rotary members, said outer drum assembly including an outer drum housing and front and rear annular end cover plates fixably secured thereto;

a set of first viscous clutch plates disposed within said fluid chamber and coupled to said outer drum housing for rotation with said first rotary member;

a set of second viscous clutch plates disposed in said fluid chamber and coupled to said inner drum housing for rotation with said second rotary member, said sets of first and second viscous clutch plates being alternately interleaved such that outermost plates of said first clutch plates are adjacent each of said end plate covers;

viscous fluid disposed within said fluid chamber, said first and second viscous clutch plates being operative to transmit torque between said first and second rotary members in response to the viscous resistance of said viscous fluid between said interleaved clutch plates within said fluid chamber; and a plurality of annular spacer rings each of which is interposed between adjacent second clutch plates for longitudinally positioning said second clutch plates so as to define a predetermined spacing therebetween, the improvement comprising:

an axially extending stop projection means formed on each of said front and rear end cover plates of said outer drum assembly and which extend longitudinally into said fluid chamber, said stop projection means being located radially inwardly of an inner peripheral edge surface of said outermost plates of said first clutch plates to permit axial sliding movement thereof with respect to said stop projection means said stop projection means for inhibiting excessive axial sliding movement of said second clutch plates located adjacent to said stop projection means for cooperating with said annular spacer rings to maintain said predetermined spacing of said second clutch plates within said fluid chamber.

2. The viscous coupling of claim 1 wherein said projection is an annular hublike member formed on each of said front and rear cover plates, said hub-like members being located radially outward from external spline means formed on said inner drum housing upon which internal spline means formed on said second set of clutch plates is fixably secured.

3. The viscous coupling of claim 2 wherein said annular hub-like members have an axial length which extends at least partially over said external spline means of said inner drum housing for maintaining said predetermined spacing between adjacent plates of said second set of clutch plates within said fluid chamber while inhibiting said second set clutch plates adjacent said hub-like projections from falling-off said external spline means.

4. In a viscous coupling apparatus for power drive systems comprising:

a first rotary member;

a second rotary member coaxially disposed relative to said first rotary member such that said first and second rotary members are rotatable with respect to each other;

an inner drum housing fixably coupled to said first rotary member;

an outer drum assembly fixably coupled to said second rotary member, said outer drum assembly including an outer drum housing and front and rear annular end covers fixably secured thereto, said inner drum housing and said outer drum assembly arranged to define a hermetically sealed fluid chamber therebetween;

a plurality of first clutch plates disposed within said fluid chamber and coupled to said inner drum housing for rotation with said first rotary member;

a plurality of second clutch plates disposed in said fluid chamber and coupled to said outer drum housing for rotation with said second rotary member, said first and second clutch plates being alternately interleaved with the outermost plates of said second clutch plates located adjacent to said front and rear end covers;

viscous fluid disposed within said fluid chamber, said interleaved clutch plates being operative to transmit torque between said first and second rotary members in response to the viscous resistance of said viscous fluid between said interleaved clutch plates; and annular spacer rings interposed between adjacent first clutch plates for longitudinally positioning said first clutch plates within said fluid chamber to define a predetermined spacing therebetween, the improvement comprising:

a first longitudinally extending integral thin-walled hub formed on said front annular end cover and a second longitudinally extending integral thin-walled hub formed on said rear annular end cover which are was engagable with the outermost plates of said first clutch plates for inhibiting excessive axial sliding movement thereof while concomitantly permitting axial sliding movement of said outermost plates of said second clutch plates with respect to said end covers and said outermost first clutch plates.

5. The viscous coupling of claim 4 wherein said first and second thin wall integral hubs are an annular member formed on said front and rear covers that is located radially outwardly from external splines formed on said inner drum housing upon which internal splines formed on said first clutch plates are fixably secured, and said first and second thin wall integral hubs are located radially inwardly of an innermost peripheral edge of said outermost plates of said second clutch plates.

6. The viscous coupling of claim 5 wherein said first and second thin wall integral hub an axial length which extends at least partially over said external splines of said inner drum housing for maintaining said predetermined spacing between adjacent first clutch plates within said fluid chamber.

* * * * *